US010891184B2

(12) United States Patent
Chen et al.

(10) Patent No.: US 10,891,184 B2
(45) Date of Patent: Jan. 12, 2021

(54) CONFIGURABLE DATA INTEGRITY MODE, AND MEMORY DEVICE INCLUDING SAME

(71) Applicant: MACRONIX INTERNATIONAL CO., LTD., Hsinchu (TW)

(72) Inventors: Ken-Hui Chen, Hsinchu (TW); Kuen-Long Chang, Taipei (TW); Yi-Fan Chang, Taoyuan (TW)

(73) Assignee: MACRONIX INTERNATIONAL CO., LTD., Hsinchu (TW)

(*) Notice: Subject to any disclaimer, the term of this patent is extended or adjusted under 35 U.S.C. 154(b) by 0 days.

(21) Appl. No.: 16/419,430

(22) Filed: May 22, 2019

(65) Prior Publication Data

US 2020/0371861 A1 Nov. 26, 2020

(51) Int. Cl.
*G06F 3/06* (2006.01)
*G06F 11/10* (2006.01)

(52) U.S. Cl.
CPC .......... *G06F 11/1004* (2013.01); *G06F 3/064* (2013.01); *G06F 3/0619* (2013.01); *G06F 3/0673* (2013.01)

(58) Field of Classification Search
CPC .... G06F 11/1004; G06F 3/064; G06F 3/0619; G06F 3/0673
USPC .......................................................... 714/807
See application file for complete search history.

(56) References Cited

U.S. PATENT DOCUMENTS

| 4,325,120 | A * | 4/1982 | Colley .................... G06F 9/546 |
| | | | 711/202 |
| 6,601,216 | B1 | 7/2003 | Obata |
| 6,708,273 | B1 * | 3/2004 | Ober ......................... G06F 8/60 |
| | | | 713/189 |
| 6,967,961 | B1 * | 11/2005 | Chui ................... H04L 12/5601 |
| | | | 370/252 |
| 8,234,551 | B2 | 7/2012 | Shen et al. |
| 8,918,375 | B2 | 12/2014 | Li et al. |

(Continued)

OTHER PUBLICATIONS

Rivest, R., "The MD5 Message-Digest Algorithm," MIT Laboratory for Computer Science and RSA Data Security, Inc. memo, Apr. 1992, 21 pages.

*Primary Examiner* — Albert Decady
*Assistant Examiner* — Enam Ahmed
(74) *Attorney, Agent, or Firm* — Haynes Beffel & Wolfeld LLP

(57) ABSTRACT

An integrated circuit device can comprise addressable memory, and a receiver. Data integrity logic can be coupled to the input data path and configured to receive a data stream having a reference address, and a plurality of data chunks with data integrity codes. Also, the data integrity logic can include a configuration store to store configuration data for the data integrity checking. Also, the integrated circuit can include logic to parse the data chunks and the data integrity codes from the data stream, and logic to compute computed data integrity codes of data chunks in the received data stream, and compare the computed data integrity codes with received data integrity codes to test for data errors in the received data stream. The data integrity logic includes logic responsive to the configuration data that control the data integrity logic. In one aspect, the data integrity data indicates a floating boundary data integrity mode or a fixed boundary data integrity mode.

22 Claims, 7 Drawing Sheets

(56) References Cited

U.S. PATENT DOCUMENTS

| | | | |
|---|---|---|---|
| 2011/0041046 A1* | 2/2011 | Kang | G06K 19/073 |
| | | | 714/807 |
| 2011/0231657 A1* | 9/2011 | Tian | H04L 63/123 |
| | | | 713/161 |
| 2015/0318867 A1* | 11/2015 | Wiley | G06F 11/1004 |
| | | | 714/807 |
| 2015/0365194 A1* | 12/2015 | Yi | H04W 76/19 |
| | | | 714/807 |
| 2018/0144802 A1* | 5/2018 | Choi | G11C 16/225 |

\* cited by examiner

CONFIGURABLE DATA INTEGRITY MODE, AND MEMORY DEVICE INCLUDING SAME

BACKGROUND

Field

The present invention relates to methods for utilization of data integrity checks such as cyclic redundancy checking, and particularly is applied to integrated circuits.

Description of Related Art

Data integrity checking is used in a variety of settings, including when data streams are transferred on communication channels, such as to and from memory devices. For example, cyclic redundancy check CRC codes, checksums or hashes generated using standards like the Message-Digest Algorithm MD5 and the Secure Hash Algorithm SHA-1, or other codes usable for data integrity checking, have been embedded in data streams transmitted on communication channels. A receiving device parses the data stream to identify chunks of data and corresponding data integrity codes for the chunks. The identified chunks are then used to compute a computed data integrity code, which can be compared with the received data integrity code to indicate whether the chunk of data includes errors or has otherwise been altered.

It is desirable to provide technologies that can expand the utilization of data integrity checking in integrated circuits and elsewhere.

SUMMARY

A technology is described which provides flexibility in sending and receiving devices to operate in different data integrity checking ecosystems. The technology is suited for implementation in integrated circuit devices.

An integrated circuit device such as an integrated circuit memory device and an integrated circuit memory controller device can include technology described herein. For example, an integrated circuit can comprise addressable memory, and a receiver coupled to an input data path. Data integrity logic, such as for example, CRC logic can be coupled to the input data path and configured to receive a data stream having a reference address, such as a starting address in the memory, or a relative address for the data stream (which can be address 0 of the data stream), and a plurality of data chunks with CRC codes in this example. The data integrity logic can include or have access to a configuration store to store configuration data for the CRC-based data integrity checking. Also, the integrated circuit can include logic to parse the data chunks and the data integrity codes from the data stream, and logic to compute data integrity codes of data chunks in the received data stream, and compare the computed data integrity codes with received data integrity codes to test for data errors in the received data stream. The CRC logic includes circuits responsive to the configuration data that control the CRC logic. In one aspect, the CRC data indicates a floating boundary CRC mode or a fixed boundary CRC mode. The circuits responsive to the configuration data identify chunk boundaries based on the indicated mode. In the floating boundary CRC mode, the CRC chunk boundaries are based upon an offset from a reference address of the data stream. In the fixed CRC mode, the CRC chunk boundaries are based upon fixed addresses aligned for example with addresses that are multiples of CRC chunk size.

In other examples, different types of data integrity codes are used.

In various embodiments, the configuration store comprises volatile memory. In other embodiments, the configuration store comprises nonvolatile memory. For example, the configuration store can comprise a portion of a configuration register set or a command register in an integrated circuit memory device.

The configuration data can comprise a mode flag indicating the floating boundary CRC mode or the fixed boundary CRC mode. In some embodiments, the configuration data can comprise other parameters of the CRC techniques being applied, such as a data chunk size parameter and a code type parameter.

A method for operating an integrated circuit for testing received data can include the technology described herein. For example, a method for testing received data can comprise receiving a data stream having a reference address, and including a plurality of data chunks with data integrity codes; parsing the data chunks and data integrity codes from the data stream based on stored configuration data; computing data integrity codes of data chunks in the data stream, and comparing the computed data integrity codes with received data integrity codes to test for data errors. The parsing can include responding to configuration data stored on the device to enable a selected mode, and if the configuration data indicates floating boundary CRC mode, then identifying chunk boundaries based upon an offset from a reference address of the data stream, and if the configuration data indicates fixed boundary CRC mode, then identifying chunk boundaries based upon fixed addresses.

Other aspects and advantages of the present invention can be seen on review of the drawings, the detailed description and the claims, which follow.

DETAILED DESCRIPTION

A detailed description of embodiments of the present invention is provided with reference to the FIGS. 1-6.

Figure 1:
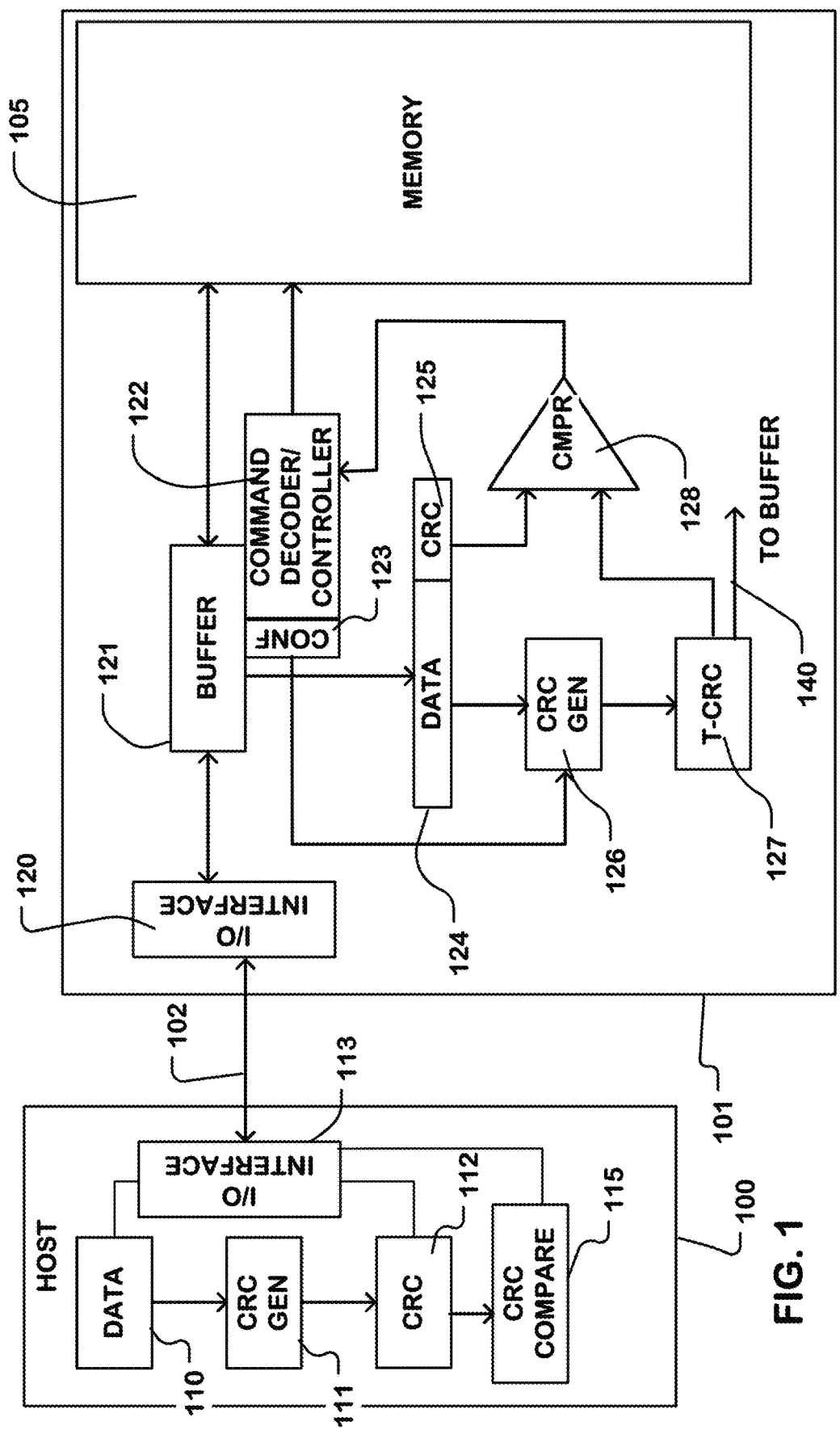
FIG. 1 is a simplified diagram of a system including an integrated circuit device with configurable CRC modes.

FIG. 1 is a simplified diagram of a system including a host device 100 acting as a sender or receiver of a data stream, and a memory device 101 including addressable memory and operable with multiple CRC modes, acting as a receiver or a transmitter of a data stream. A data channel 102 is connected between the host device 100 and the memory device 101. In various embodiments, the host device can comprise a memory controller chip or other host processor that interfaces with the memory device 101. For example, the host device 100 can transmit a command to the memory device to institute a transfer of data. If the command is to write data, then the host device 100 can send a CRC protected data stream to the memory device 101. When the command is to read data, then the host device 100 can receive a CRC protected data stream from the memory device 101. Also, the memory device can receive a command from the host device, and in support of the command, execute operations required for a data transfer. If the command is to write data, then the memory device 101 can receive a CRC protected data stream from the host device 100. When the command is to read data, then the memory device 101 can send a CRC protected data stream to the host device 100. One or both of the host device 100 and the memory device 101 can be configurable to operate in one or more CRC modes.

In this simplified illustration, the host device 100 includes an input/output interface 113, such as a serial peripheral interface, a parallel address and data interface, or other type of integrated circuit interface, comprising a receiver and a transmitter. Also, the host device 100 includes a data buffer 110 which stores data to be transmitted on the channel 102. A CRC code generator 111 processes data chunks in the buffer 110 to compute CRC codes for associated chunks in a register 112. The chunks of data are supplied by the buffer 110 to the input/output interface 113. The CRC codes for the associated chunks are supplied from register 112 to the input/output interface 113. The chunks of data and associated CRC codes (referred to in combination as CRC chunks) are transmitted on the channel 102 to the memory device 101. The channel 102 can be wireless or wired. Also, the host device 100 includes CRC compare logic 115 usable for testing data integrity when it is acting as a receiver to compare a CRC code in a received CRC chunk, with a CRC code computed using the data of the received chunk.

The memory device 101 includes an input/output interface 120, such as a serial peripheral interface, a parallel address and data interface, or other type of integrated circuit interface, comprising a receiver and a transmitter. The interface 120 supplies received data streams from channel 102 to the buffer 121 in this example, and transmits a data stream retrieved from memory 105 across the channel 102. The data stream includes CRC chunks that include a data chunk stored or to be stored in memory, and a CRC code for the data chunk. Data chunks can be aligned in memory space and can correspond, for example, with page boundaries on an integrated circuit memory, or other logical or physical data chunk boundary in the memory space suitable for defining data chunks subject of CRC processing. A data stream to be transmitted or received by the integrated circuit, however, may have a starting address in memory space that does not correspond with a page boundary or other logical boundary used for CRC processing. The CRC chunk boundaries can be set based on the fixed address (fixed boundary), or based on the starting address of the memory stream (floating boundary) according to the particular configuration set up for the communication channel using the CRC codes.

The buffer 121 is also connected to the memory 105. The buffer 121 is an element of a data path between the interface 120 and memory 105 on the memory device 101.

For the purposes of this discussion, a command decoder/controller 122 is coupled to the buffer. On an integrated circuit memory device, for example, input commands may be received through the interface 120 and decoded in the command decoder/controller 122. The command decoder/controller 122 comprises state machines and other logic necessary to execute memory operations for the memory 105 in response to decoded commands. Also, the command decoder/controller 122 is operable to control the CRC circuits in support of checking and communicating data including CRC codes, and in support of composing data streams of CRC chunks for transmission.

Circuits supporting data integrity check operations include a data chunk buffer 124 storing a data chunk received from the buffer 121, and a CRC code buffer 125 for storing the CRC code associated with the data chunk stored in the data chunk buffer 124. For a case in which the host device 100 acts as the source or sender of the CRC protected data stream and the memory device 101 is the receiver, the command decoder/controller 122 controls the buffer 121 to parse a received data stream to identify CRC chunks, including chunks of data and associated CRC codes, and to transfer the identified CRC chunks into the buffers 124, 125. The parsed data from the received data stream as received from the host device 100, can be transferred in parallel from the buffer 121 to the data chunk and CRC code buffers (124, 125) in some embodiments. In other embodiments, the parsed data can be transferred one byte, or one storage unit of other sizes, in sequence.

A CRC generator 126 operates on the data chunk in the buffer 124 to produce a computed CRC code to store in register 127. A comparator 128 is one input coupled to the CRC buffer 125, and another input coupled to the computed CRC code in the register 127. The output of the comparator is supplied to the command decoder/controller 122 in this example. In the case of a match, then the data integrity is confirmed. In the case of a mismatch indicating detection of an error, then the data integrity for the corresponding data chunk is flagged for use by the command decoder/controller 122.

In some embodiments, when the data integrity is flagged, the command decoder/controller can abort the write operation. In other embodiments, when the data integrity is flagged, the command decoder/controller can notify the sender, with or without proceeding with the write operation.

A configuration store 123 is provided on the memory device 101, and accessible by CRC logic of the command decoder/controller 122 and by the CRC generator 126. The configuration store 123 can include a mode flag indicating whether the incoming data stream is to be processed according to a floating CRC boundary, or a fixed CRC boundary, and whether an outgoing data stream is to be configured according to a floating CRC boundary, or a fixed CRC boundary. Also, the configuration store 123 can include parameters indicating the size of the data chunk or other parameters of the CRC function. The command decoder/controller 122 includes logic supporting both floating CRC boundary and fixed CRC boundary modes, and is responsive to the mode flag to enable the appropriate elements of the circuitry. Also, the command decoder/controller 122 can include logic to implement other parameters of the configuration store 123, such as data chunk size, CRC code size and the like. The configuration store 123 can be implemented using nonvolatile memory, such as programmable flash memory, one time programmable read-only memory, and the like, which retains the configuration data through power-down cycles. Also, the configuration store 123 can be implemented using volatile memory, such as SRAM memory or DRAM memory. In some embodiments, the configuration store 123 can be a portion of a configuration register set of an integrated circuit memory device.

Using a programmable configuration store, the memory device 101 supports operations to read and write the configuration data in the configuration store during device setup, or during operation of the device. For example, the configuration data can be written to the configuration store at any time in advance of the sending of the data stream to the device.

In some embodiments, the configuration data is carried by commands to write the received data stream to addressable memory, or to read a data stream to be transmitted from addressable memory. The command decoder/controller 122 can use the command to set the configuration data in the configuration store, or the command itself can be the configuration data. The configuration store 123 can be a command register or other register coupled with the command decoder/controller 122 in which the command or part of the command is stored during decoding for at least long enough to enable the appropriate data integrity circuits for the operation. The configuration data can be implied by the command code, such that one command code is used for the floating mode and a different one is used for the fixed boundary mode. Also, the configuration data can be part of immediate data carried with the command, such that one command code is used for both modes, with a configuration flag carried as immediate data with the command code.

In a read operation, in which the memory device acts as the sender of CRC protected data, the CRC generator 126 and CRC register 127 can be used (as represented by arrow 140) to provide CRC codes to be multiplexed with an associated data chunk in the buffer 121 to compose a data stream to be transmitted to a destination device via the interface 120. The data integrity configuration mode flag can be used to determine whether to use a floating CRC boundary or a fixed CRC boundary data packet format when sending data to a receiving device. In the read mode, in which the memory device 101 sends data to the host device, the data buffer 124 and the CRC buffer 125 may not be utilized.

The memory device 101 as described includes addressable memory 105; a receiver (in I/O interface 120) to receive a data stream having a reference address, and including a plurality of data chunks with CRC codes; a configuration store 123 to store configuration data; logic (e.g., 121, 122, 124) to parse the data chunks and CRC codes from the data stream; and logic (e.g., 126) to compute CRC codes of data chunks in the data stream (corresponding to the data chunks in buffer 110 and CRC codes in buffer 112 in the host device), and compare (e.g., 127, 128) the computed CRC codes with received CRC codes to test for data errors, along with circuits (122) responsive to the configuration data, and if the configuration data indicates floating boundary CRC mode, then to identify chunk boundaries based upon an offset equal to a length of a CRC chunk from a reference address of the data stream, and if the configuration data indicates fixed boundary CRC mode, then to identify chunk boundaries based upon a fixed address equal to a data chunk boundary in memory space.

Also, the memory device 101 as described includes logic (e.g., 122, 121) to retrieve a plurality of data chunks from the addressable memory; logic (126) to compute CRC codes of data chunks for the plurality of data chunks retrieved from the addressable memory (which can transfer the CRC codes through buffer 125 to buffer 121 on line 140); a transmitter (in I/O interface 120 which receives CRC chunks from buffer 121); and circuits (e.g., 121, 122) responsive to the configuration data to compose a data stream, including the plurality of data chunks with the computed CRC codes, to be transmitted by the transmitter, which if the configuration data indicates floating boundary CRC mode, inserts data chunks in the data stream on chunk boundaries based upon an offset from a reference address of the data stream, and if the configuration data indicates fixed boundary CRC mode, inserts data chunks in the data stream on chunk boundaries based upon fixed addresses.

As mentioned above, all of the embodiments describe herein can include different types of data integrity codes, like checksums or hashes generated using MD5 or SHA-1. In some embodiments, the type of code can be indicated by the configuration data.

Figure 2:
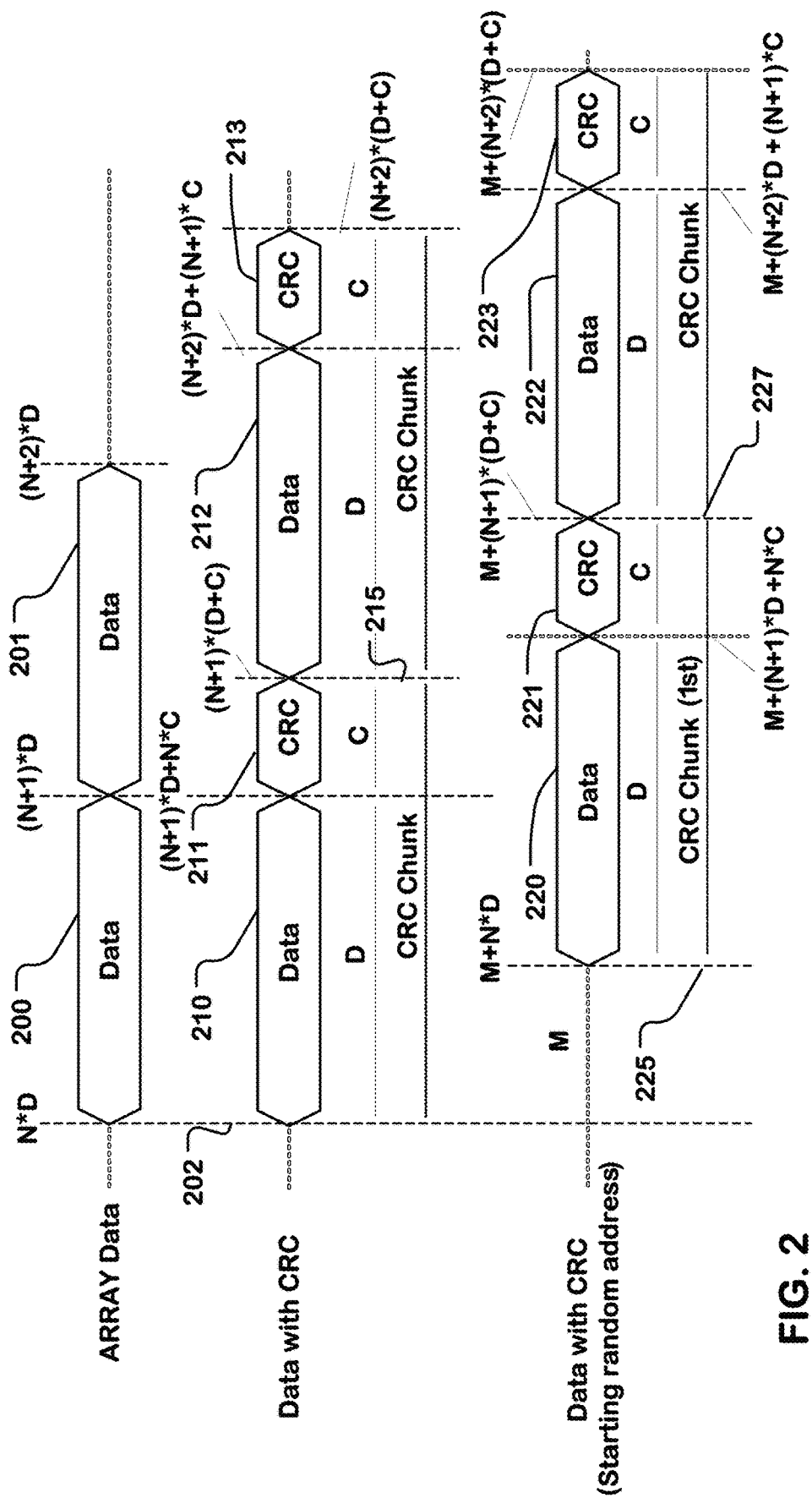
FIG. 2 illustrates CRC data flows for a floating boundary CRC mode.

FIG. 2 is a timing diagram for a CRC-based ecosystem illustrating a CRC mode with the floating chunk boundary. The first line illustrates data as received from a data source (such as the memory device 101 or the host device 100 in FIG. 1), without embedded CRC codes. The data shown includes a first data chunk 200 and a second data chunk 201. The boundaries between chunks align on multiples (N) of the size (D) of the data chunks, and therefore lie on chunk boundaries offset from a reference address for the data stream, on standard CRC chunk boundary 202. The boundary 202 of data chunk 200 lies therefore at address N*D.

The second line in FIG. 2 illustrates the data with embedded CRC codes. The data shown includes a first data chunk 210 and a second data chunk 212. The first data chunk 210 has a CRC code 211 associated with it. Likewise, the second data chunk 212 includes a CRC code 213 associated with it. In combination, a data chunk and its associated CRC code are referred to as a CRC chunk. The boundary of a CRC chunk, such as boundary 215, is a multiple of the size (D+C) of a CRC chunk. Thus, boundary 215 lies at address (N+1)*(D+C) relative to a reference address for the data stream.

Data can be received in a data stream with a random starting address from the memory space, such as illustrated in the third line of FIG. 2, or other kind of reference address. Thus, a random starting address can be characterized by an offset M from a standard CRC chunk boundary 202 in the memory space. Thus, with a floating CRC chunk boundary, the first CRC chunk including data chunk 220 and CRC code 221 has a starting boundary 225 at address M+(N*D), and an ending boundary 227 at address M+(N+1)*(D+C). A second CRC chunk includes data chunk 222 and CRC code 223, and has an ending boundary at address M+(N+2)*(D+C) in memory space. This offset value M is applied to all CRC chunks in the data stream, which results in the CRC chunk boundaries in the data stream being misaligned with the fixed boundaries in the memory space.

Thus, the command decoder/controller of FIG. 1 operates in a floating CRC chunk boundary mode by parsing an incoming data stream according to a reference address for the data stream (i.e. the start address of the data stream) which is equal to the offset M from a data chunk boundary address in memory space, the size of the data chunk, and the size of the associated CRC code to provide appropriate segments of the incoming data stream to the CRC logic. In this mode, the first CRC chunk is guaranteed to include a full data chunk, and provide reliable integrity checking.

Figure 3:
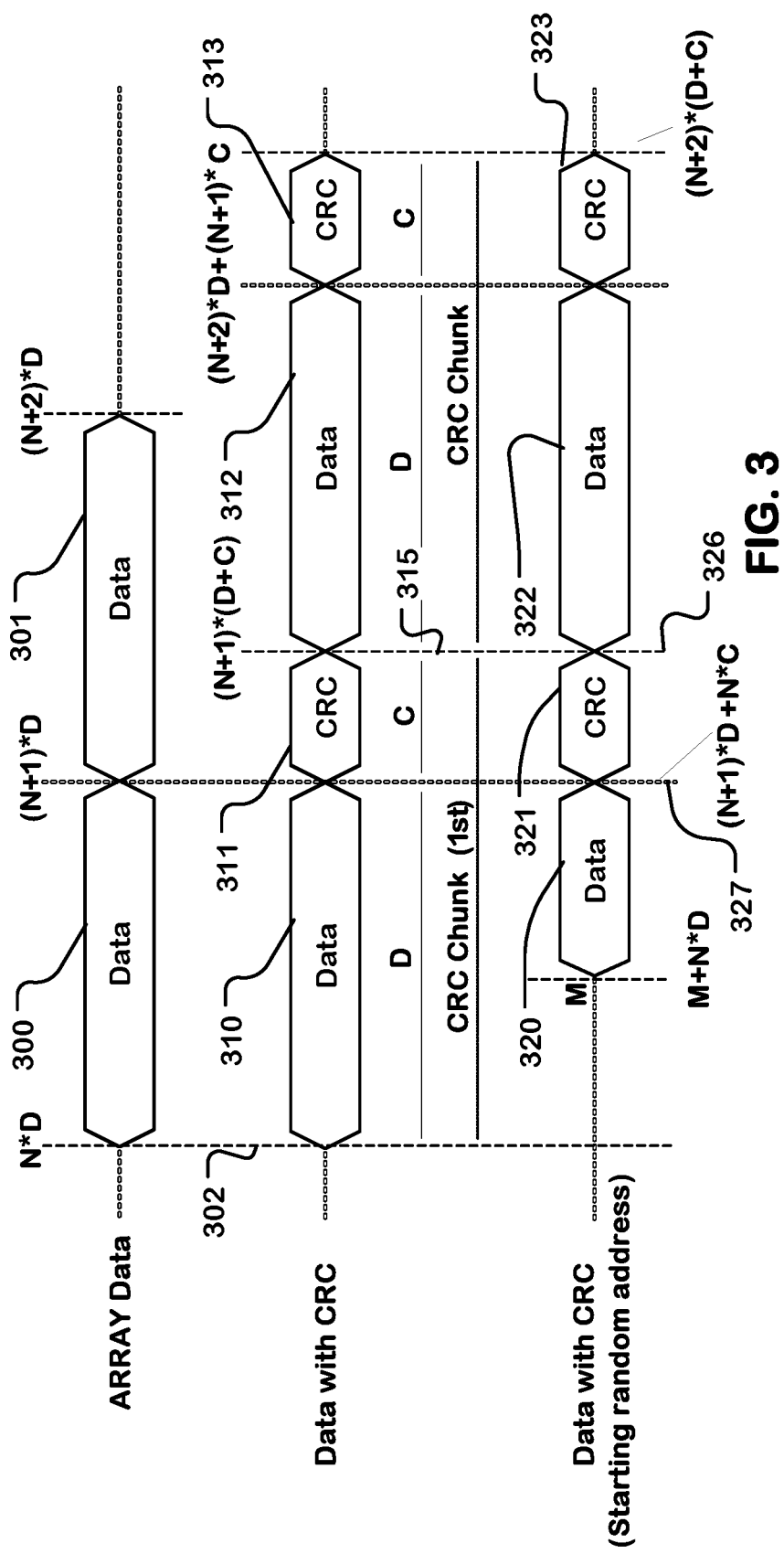
FIG. 3 illustrates CRC data flows for a fixed boundary CRC mode.

FIG. 3 is a timing diagram for a CRC-based ecosystem illustrating a CRC mode with a fixed chunk boundary. The first line illustrates data as received from a data source (such as the memory device 101 or the host device 100 in FIG. 1), without embedded CRC codes. The data shown includes a first data chunk 300 and a second data chunk 301. The boundaries between chunks are multiples (N) of the size (D) of the data chunks. The boundary 302 of data chunk 300 lies therefore at address N*D.

The second line in FIG. 3 illustrates the data with embedded CRC codes. The data shown includes a first data chunk 310 and a second data chunk 312. The first data chunk 310 has a CRC code 311 associated with it. Likewise, the second data chunk 312 includes a CRC code 313 associated with it. In combination, a data chunk and its associated CRC code are referred to as a CRC chunk. The boundary of a CRC chunk, such as boundary 315, is a multiple of the size (D+C) of a CRC chunk in the memory space. Thus, boundary 315 lies at address (N+1)*(D+C) in memory space.

The third line of FIG. 3 illustrates the configuration for data received in a data stream with a random starting address having an offset M from a data boundary 302, which is a fixed address in memory space. Thus, the address of the first data in the data stream in this example lies at M+(N*D). This offset value M is applied only to the first CRC chunk in the data stream, which results in the first data chunk of the first CRC chunk being truncated, but the boundaries in the data stream between CRC chunks, are aligned with the offsets relative to the fixed address of the data boundary in the memory space. The fixed CRC chunk boundary 326 however lies at a fixed multiple of the size of the CRC chunk in memory space, including the data chunk size plus the size of the CRC code. Thus, boundary 326 lies at address (N+1)*(D+C) in memory space. In this example, the CRC code 321 for data chunk 320 has a fixed length C. Thus, the boundary 327 of the first CRC chunk 320 in this random offset mode lies at address (N+1)*D, independent of the offset M in the random starting address of the stream. This results in a case in which the data chunk 320 of the first CRC chunk is truncated. Subsequent CRC chunks (e.g. combination of data chunk 322 and associated CRC code 323) are aligned with the fixed boundaries at offsets relative to the fixed address, and maintain the possibility of integrity checking without truncated data chunks. The truncated first data chunk 320 may have an invalid CRC code 321, making the integrity checking of the first data chunk impossible.

Thus, the command decoder/controller of FIG. 1 operates in a fixed CRC chunk boundary mode by parsing an incoming data stream according to fixed boundaries determined by the size of the data chunk D and the size of the associated CRC code C, and fixed addresses in memory space.

Figure 4A:
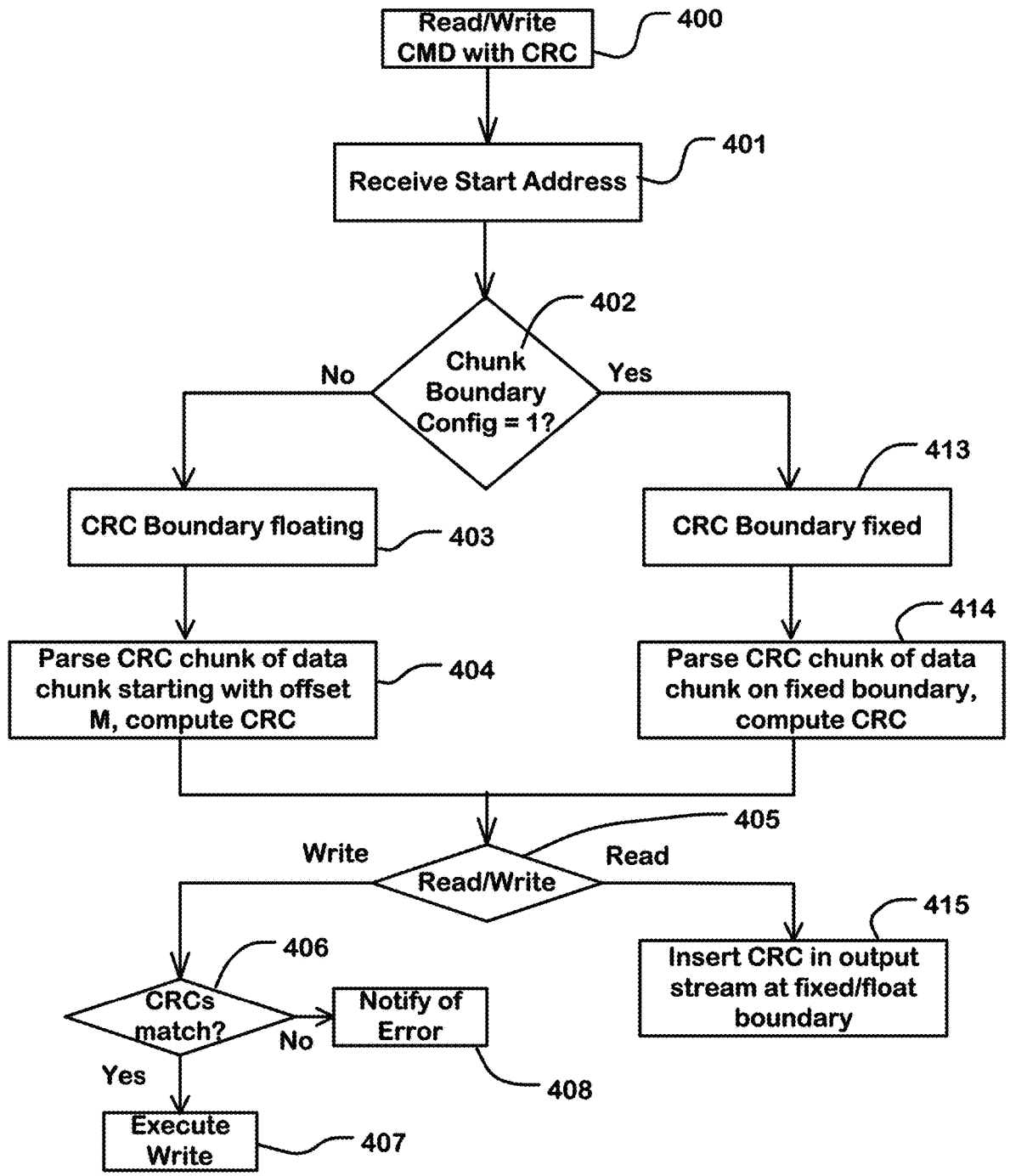
FIG. 4A is a flowchart of a method that can be executed by logic on an integrated circuit like that of FIG. 1.

FIG. 4A is a simplified flowchart of logic for a CRC-based ecosystem which can be implemented in the command decoder/controller 122 and the memory device 101 of FIG. 1, or in CRC controllers in other types of integrated circuit devices having multiple-mode CRC circuitry as described herein.

In this example, the process begins with a read/write command with a CRC operation 400. As part of the command, for example, a start address is received 401. Next, it is determined whether a chunk boundary configuration flag is set (block 402). If the boundary flag is not set (e.g. =0), then the logic is enabled to operate in the floating CRC boundary mode 403.

In the floating CRC boundary mode, the logic parses the incoming data stream or data received from a read operation to provide a first CRC chunk including a data chunk of length D beginning at the offset M from a multiple of D, and an associated CRC code of length C, and computes a CRC using the received data stream or the data stream to be transmitted (block 404).

If at block 402, the chunk boundary configuration flag is set (e.g. =1), then the logic is enabled to operate in a fixed CRC boundary mode (block 413).

In the fixed CRC boundary mode, the logic parses the incoming data stream for a write operation or data received from a read operation to provide a first CRC chunk including a data chunk of length D. In this case, the CRC code is computed for a data chunk on a fixed CRC chunk boundary without reference to offset M, and computes a CRC using the received data stream or the data stream to be transmitted (block 414).

Next, after performing the function at block 404 or at block 414, based on the configuration flag, the procedure diverges depending on whether a read or a write operation is being executed (block 405). If a write operation is being executed, then the CRC logic determines whether the received CRC code and the computed CRC code, computed based on the parsed data, match (block 406). If there is a match, then the write process can be executed (block 407). If there is not a match, then a data integrity issue has been identified and a notification of the error can be provided to the sender (block 408). Also, in case of no match, the write may continue to be executed nonetheless.

If at block 405, a read operation is being executed, then the computed CRC code is inserted in the output data stream at the appropriate fixed or floating boundary (block 415).

Figure 4B:
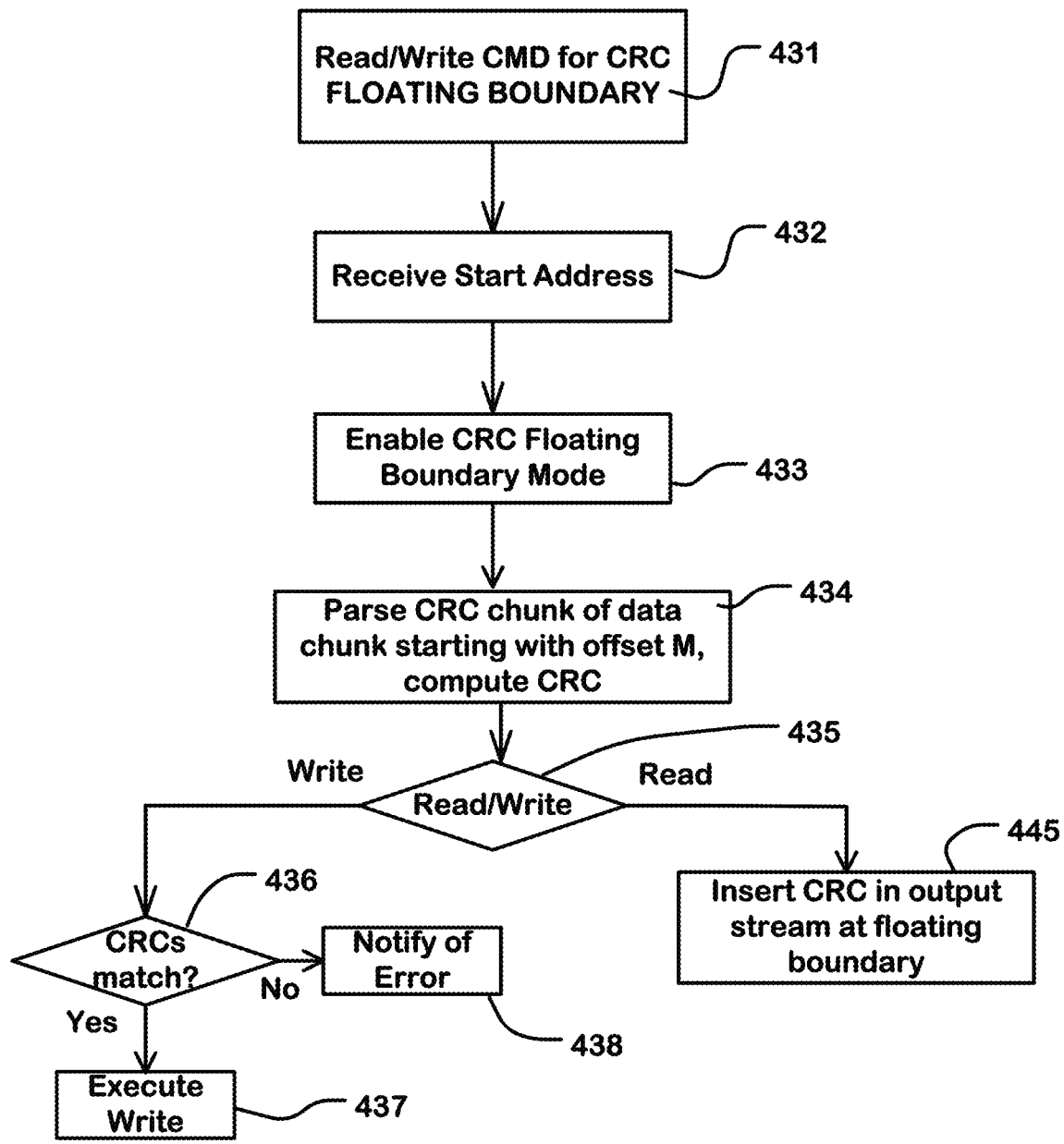
FIG. 4B is a flowchart of a method that can be executed by logic on an integrated circuit like that of FIG. 1, using a command code to indicate a floating boundary mode.

FIG. 4B is a simplified flowchart of logic for a CRC-based ecosystem which can be implemented in the command decoder/controller 122 and the memory device 101 of FIG. 1, in which the configuration data is carried in a command received associated with the data stream, that identifies a floating boundary CRC mode operation, such a write or a read to addressable memory.

In this example, the process begins with a read/write command identifying a read or write with a floating boundary CRC operation 431. As part of the command, for example, a start address is received 432. Also, the circuitry, such as a control state machine, address counters and so on, supporting the floating boundary mode is enabled (433).

In the floating CRC boundary mode, as indicated by the command, the logic parses the incoming data stream for a write operation or data received from a read operation to provide a first CRC chunk including a data chunk of length D beginning at the offset M from a multiple of D, and an associated CRC code of length C, and computes a CRC using the received data stream or the data stream to be transmitted (block 434).

Next, after performing the function at block 434 for the floating boundary configuration, the procedure diverges depending on whether a read or a write operation is being executed (block 435). If a write operation is being executed, then the CRC logic determines whether the received CRC code and the computed CRC code, computed based on the parsed data match, (block 436). If there is a match, then the write process can be executed (block 437). If there is not a match, then a data integrity issue has been identified and a notification of the error can be provided to the sender (block 438). Also, in case of no match, the write may continue to be executed nonetheless.

If at block 435, a read operation is being executed, then the computed CRC code is inserted in the output data stream at the appropriate fixed or floating boundary (block 445).

Figure 4C:
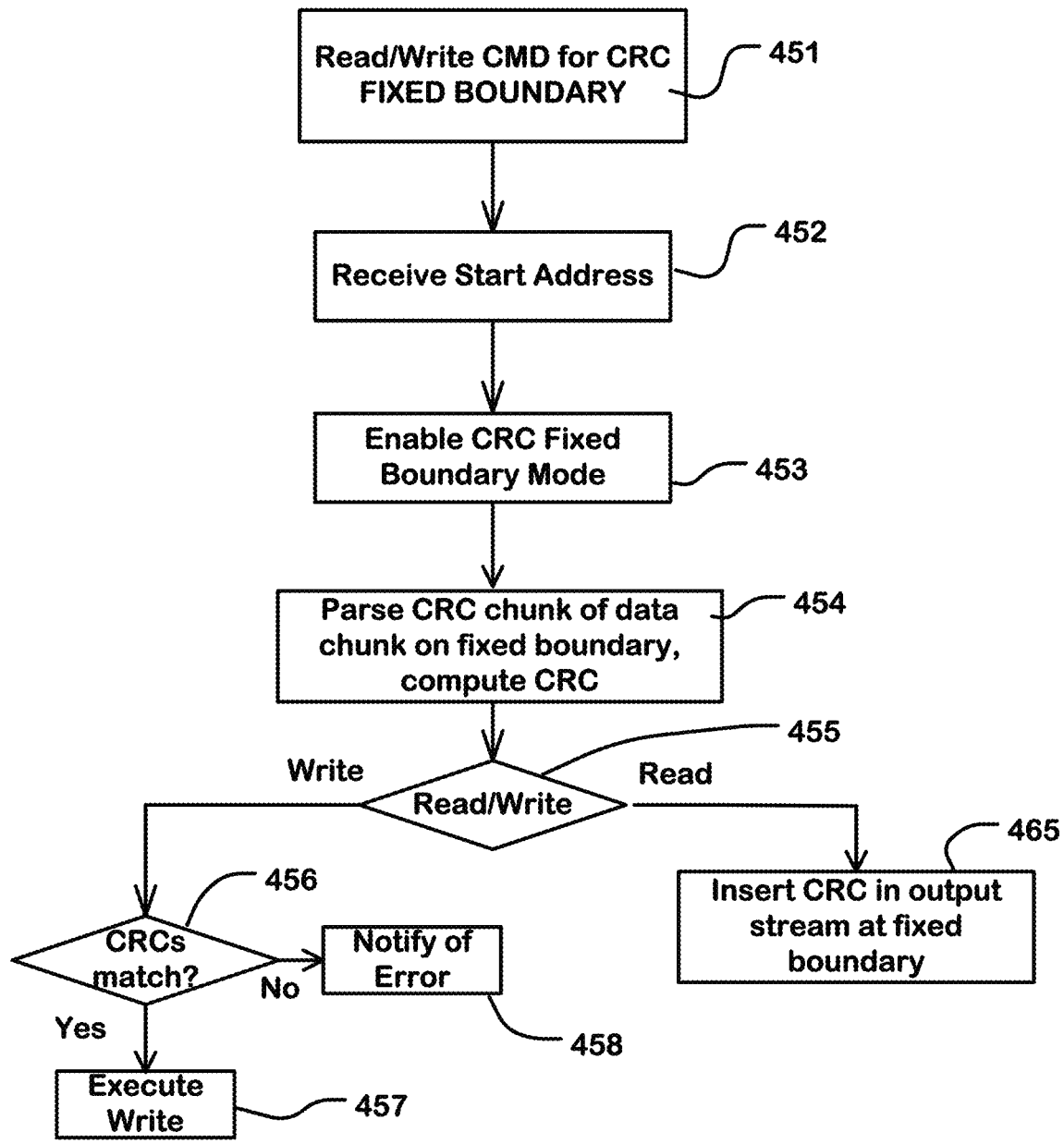
FIG. 4C is a flowchart of a method that can be executed by logic on an integrated circuit like that of FIG. 1, using a command code to indicate a fixed boundary mode.

FIG. 4C is a simplified flowchart of logic for a CRC-based ecosystem which can be implemented in the command decoder/controller 122 and the memory device 101 of FIG. 1, in which the configuration data is carried in a command received associated with the data stream, that identifies a fixed boundary CRC mode operation, such a write or a read to addressable memory.

In this example, the process begins with a read/write command identifying a read or write with a fixed boundary CRC operation 451. As part of the command, for example, a start address is received 452. Also, the circuitry, such as a control state machine, address counters and so on, supporting the fixed boundary mode is enabled (453).

In the fixed CRC boundary mode as indicated by the command, the logic parses the incoming data stream for a write operation or data received from a read operation to provide a first CRC chunk including a data chunk of length D without reference to the offset M from a multiple of D, and an associated CRC code of length C, and computes a CRC using the received data stream or the data stream to be transmitted (block 454).

Next, after performing the function at block 454 for the fixed boundary configuration, the procedure diverges depending on whether a read or a write operation is being executed (block 455). If a write operation is being executed, then the CRC logic determines whether the received CRC code and the computed CRC code, computed based on the parsed data, match (block 456). If there is a match, then the write process can be executed (block 457). If there is not a match, then a data integrity issue has been identified and a notification of the error can be provided to the sender (block 458). Also, in case of no match, the write may continue to be executed nonetheless.

If at block 455, a read operation is being executed, then the computed CRC code is inserted in the output data stream at the appropriate fixed or fixed boundary (block 465).

Other implementations of the controller for the CRC process can be by a programmable processor or configurable logic, executing instructions in software or in a configuration file. Logic to execute the method described can include instructions stored on a non-transitory computer readable storage medium storing instructions executable by a processor to perform any of the methods described above.

A computer-readable non-transitory storage medium may be any device or medium that can store code and/or data for use by a computer system. This includes, but is not limited to, volatile memory, nonvolatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

Figure 5:
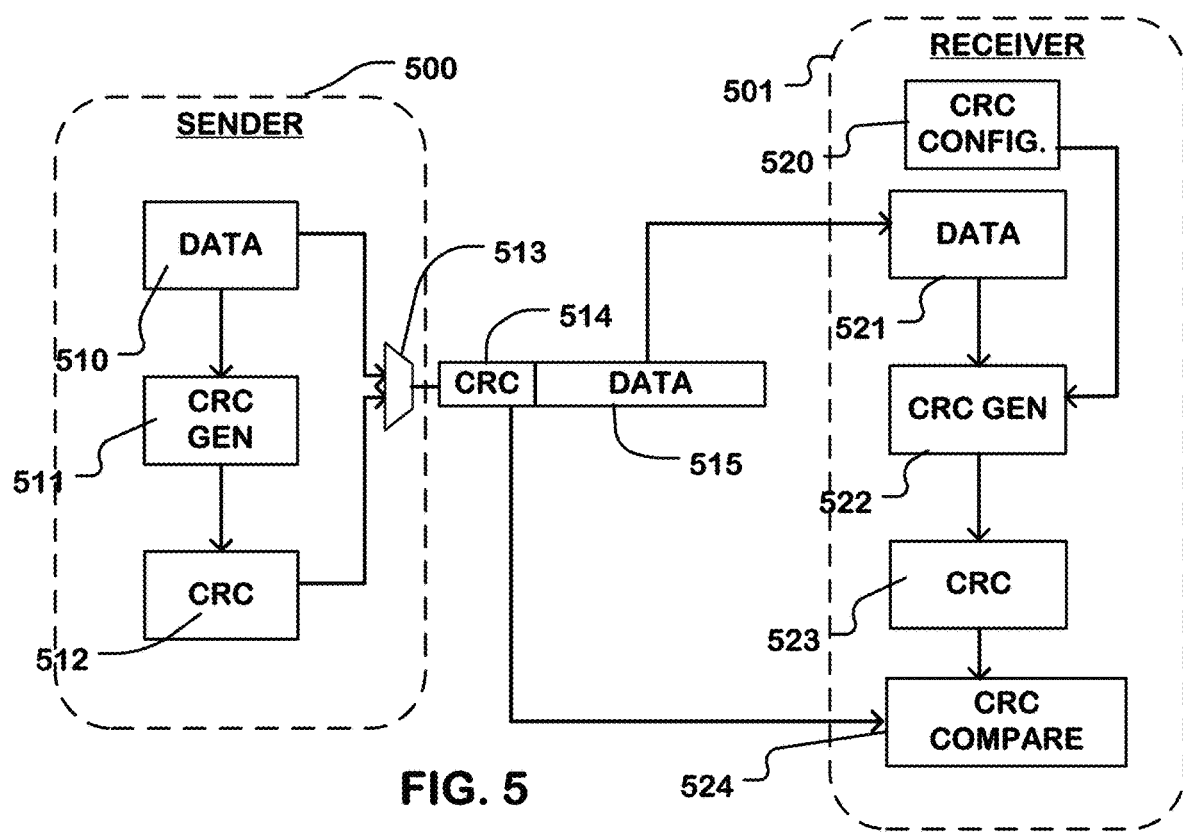
FIG. 5 is a functional block diagram of a system in which a sender that is configured to utilize CRC codes for data integrity sends a data stream to a receiver having configurable CRC modes.

FIG. 5 is a functional block diagram of a system in which a sender 500 is configured for a CRC-based ecosystem to utilize CRC codes for data integrity in a data stream sent to a receiver 501, including a CRC configuration store 520 and logic to handle a received data stream according to parameters in the CRC configuration store as described herein. The sender 500 can be, for example, a memory controller or other type of host device that communicates with the receiver 501. The receiver 501 can be, for example, a memory device such as a flash memory device. Alternatively, the receiver 501 can be any integrated circuit device including addressable memory, such as a processor device with scratchpad memory or other types of memory supporting a memory address space.

The sender 500 includes a data buffer 510, a CRC generator 511, and a CRC register 512. In order to send a data stream, a data chunk from the data buffer 510 and a CRC code from the CRC register 512 are multiplexed in multiplexer 513 on an I/O interface and transmitted as a data stream including a sequence of one or more CRC chunks that includes a data chunk 515 and its associated CRC value 514.

The receiver 501 receives the data stream, and stores the data chunk 515 in a data buffer 521, and applies the CRC value to a CRC compare block 524. A CRC generator 522 and a CRC register 523 on the receiver are used to generate a computed CRC code that is applied (block 514) to the CRC compare block 524. The CRC compare block indicates whether the received CRC chunk passes the data integrity check. As described herein, the receiver 501 includes a CRC configuration store 520. The CRC generator 522 is responsive to the parameters in the CRC configuration store 520 to parse the incoming data stream to identify the CRC chunks according to a fixed or floating boundary configuration as described above. The CRC generator computes a CRC value, and applies it to the CRC compare block 524. If the computed CRC does not match the received CRC 514, then the data integrity is compromised.

Figure 6:
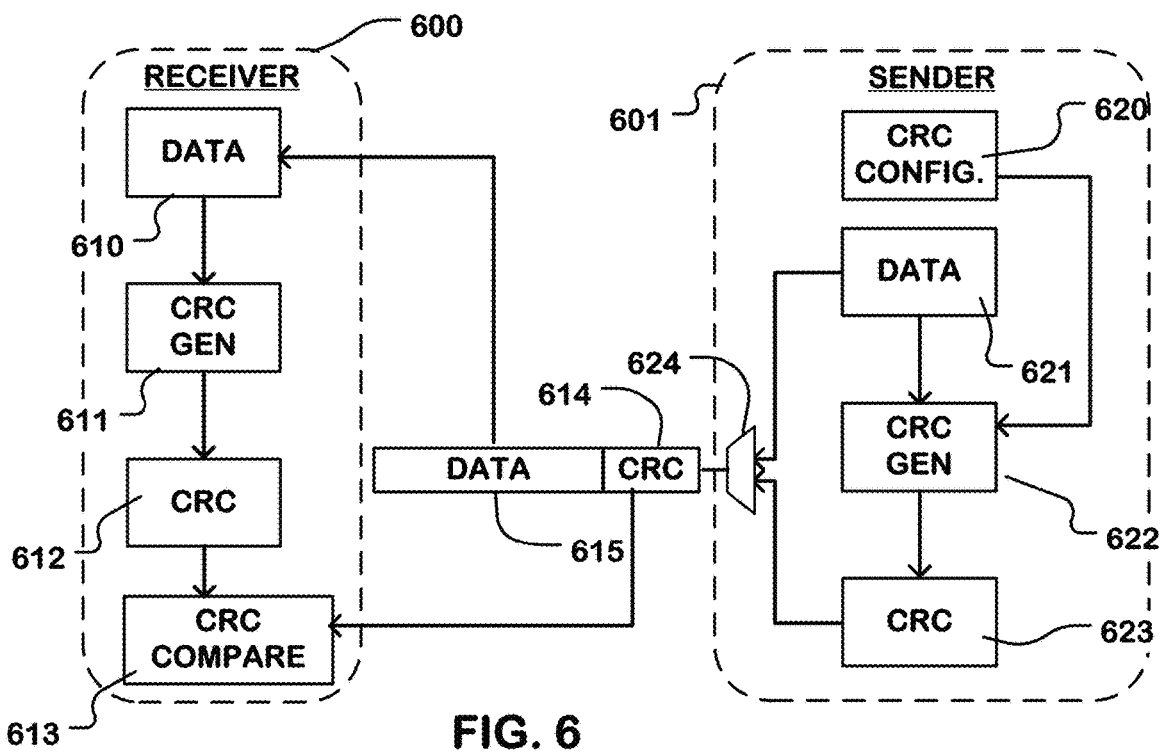
FIG. 6 is a functional block diagram of a system in which a sender having configurable CRC modes sends a data stream to a receiver that is configured to utilize CRC codes for data integrity.

FIG. 6 is a functional block diagram, including a receiver 600 configured for a CRC-based ecosystem to utilize CRC codes for data integrity. The receiver 600 receives a data stream including CRC chunks from a sender 601, including a CRC configuration store 620 and logic to compose a data stream according to parameters in the CRC mode indicated in the configuration store 620. The receiver 600 can be, for example, a memory controller or other type of host device that communicates with the sender 601. The sender 601 can be, for example, a memory device such as a flash memory device. Alternatively, the sender 601 can be any integrated circuit device including memory, such as a processor device with scratchpad memory or other types of memory supporting a memory address space.

The receiver 600 includes a data buffer 610, a CRC generator 611, a CRC register 612, and a CRC compare module 613. The sender 601 includes a CRC configuration store 620, a data buffer 621, a CRC generator 622, and a CRC register 623. The sender 601 is configured to multiplex data chunks from the data buffer 621, with associated CRC codes from the register 623 using a multiplexer 624 in an I/O interface to compose a data stream including a plurality of CRC chunks. Each of the CRC chunks includes a data chunk 615, and an associated CRC code 614. The CRC generator 622 is responsive to parameters in the configuration store 620 to compute CRC values based on fixed or floating boundary modes as indicated by the parameters.

Thus, as illustrated in FIGS. 5 and 6, the data integrity configuration mode technology described herein can be utilized by a receiver device or by a sender device. Also, in some embodiments, the configuration mode technology can be applied in a single device for both receiving and transmitting data streams.

A byte is a basic storage unit used in many integrated circuit logic and memory circuits, and consists of eight bits. A basic storage unit can have other sizes, including for example one bit, two bits, four bits, 16 bits and so on. Thus, a chunk can be any number of bytes or other storage units.

Flowcharts illustrating logic executed by a device receiving CRC protected data streams are described herein. The logic can be implemented using processors programmed using computer programs stored in memory accessible to the computer systems and executable by the processors, by dedicated logic hardware such as state machines or other control circuits on the device, and by combinations of dedicated logic hardware and computer programs. It will be appreciated that many of the steps in the flow chart can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

Embodiments are described herein based on the use of CRC codes. Other embodiments can utilize, and the described embodiments can be modified to utilize, different types of data integrity codes, such as other kinds of checksums and hashes, including error checking and correcting codes can be utilized.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for data integrity checking, comprising:
  receiving on a device, a data stream having a reference address, and including a plurality of data chunks with data integrity codes;
  parsing the data chunks and data integrity codes from the data stream; and
  computing data integrity codes of data chunks in the data stream, and comparing the computed data integrity codes with received data integrity codes to test for data errors, wherein said parsing includes:
  responding to configuration data stored on the device, and if the configuration data indicates floating boundary data integrity mode, then identifying chunk boundaries based upon an offset from a reference address of the data stream, and if the configuration data indicates fixed boundary data integrity mode, then identifying chunk boundaries based upon fixed addresses.

2. The method of claim 1, wherein the data integrity codes comprise CRC codes.

3. The method of claim 1, including storing the configuration data in nonvolatile memory on the device.

4. The method of claim 1, including storing the configuration data in volatile memory on the device.

5. The method of claim 1, wherein the configuration data includes a mode flag indicating the floating boundary data integrity mode or the fixed boundary data integrity mode.

6. The method of claim 1, wherein the fixed address is fixed relative to addresses for an addressable memory, and the reference address identifies a start of the data stream.

7. The method of claim 1, including receiving a command to write the data stream to addressable memory, the command including the configuration data.

8. A method for data integrity checking, comprising:
  retrieving on a device, a plurality of data chunks from an addressable memory;
  computing data integrity codes of data chunks for the plurality of data chunks; and
  sending from the device, a data stream having a reference address, and including the plurality of data chunks with the computed data integrity codes, wherein said sending includes:
  responding to configuration data stored on the device, and if the configuration data indicates floating boundary data integrity mode, then inserting data chunks in the data stream on chunk boundaries based upon an offset from a reference address of the data stream, and if the configuration data indicates fixed boundary data integrity mode, then inserting data chunks in the data stream on chunk boundaries based upon a fixed address.

9. The method of claim 8, wherein the data integrity codes comprise CRC codes.

10. The method of claim 8, including storing the configuration data in nonvolatile memory on the device.

11. The method of claim 8, including storing the configuration data in volatile memory on the device.

12. The method of claim 8, wherein the configuration data includes a mode flag indicating the floating boundary data integrity mode or the fixed boundary data integrity mode.

13. The method of claim 8, wherein the fixed address is fixed relative to addresses for the addressable memory, and the reference address identifies a start of the data stream.

14. The method of claim 8, including receiving a command to read the data stream from addressable memory, the command including the configuration data.

15. An integrated circuit, comprising:
  addressable memory;
  a receiver to receive a data stream having a reference address, and including a plurality of data chunks with data integrity codes;
  a configuration store to store configuration data;
  logic to parse the data chunks and data integrity codes from the data stream; and
  logic to compute data integrity codes of data chunks in the data stream, and compare the computed data integrity codes with received data integrity codes to test for data errors, wherein said logic to parse includes:
  circuits responsive to the configuration data, and if the configuration data indicates floating boundary data integrity mode, then to identify chunk boundaries based upon an offset from a reference address of the data stream, and if the configuration data indicates fixed boundary data integrity mode, then to identify chunk boundaries based upon a fixed address.

16. The integrated circuit of claim 15, wherein the data integrity codes comprise CRC codes.

17. The integrated circuit of claim 15, wherein the configuration store is nonvolatile memory.

18. The integrated circuit of claim 15, wherein the configuration store is volatile memory.

19. The integrated circuit of claim 15, wherein the configuration data includes a mode flag indicating the floating boundary data integrity mode or the fixed boundary data integrity mode.

20. The integrated circuit of claim 15, wherein the fixed address is fixed relative to addresses for the addressable memory, and the reference address identifies a location relative to a start of the data stream.

21. The integrated circuit of claim 15, including logic to retrieve a plurality of data chunks from the addressable memory;
  logic to compute data integrity codes of data chunks for the plurality of data chunks retrieved from the addressable memory;
  a transmitter; and circuits responsive to the configuration data to compose a data stream, including the plurality of data chunks with the computed data integrity codes, to be transmitted by the transmitter which, if the configuration data indicates floating boundary data integrity mode, inserts data chunks in the data stream on chunk boundaries based upon an offset from a reference address of the data stream, and if the configuration data indicates fixed boundary data integrity mode, inserts data chunks in the data stream on chunk boundaries based upon a fixed address.

22. The integrated circuit of claim 15, including a command decoder, including logic to decode read and write commands to generate the configuration data.

\* \* \* \* \*